United States Patent Office 3,674,528
Patented July 4, 1972

3,674,528
TITANIUM DIOXIDE PIGMENT COMPOSITIONS OF MATTER USEFUL IN PRINTING INK COMPOSITIONS
George E. Bronson, Englishtown, N.J., assignor to NL Industries, Inc.
No Drawing. Filed Oct. 22, 1970, Ser. No. 83,166
Int. Cl. C09c 1/36
U.S. Cl. 106—300                    2 Claims

ABSTRACT OF THE DISCLOSURE

The present invention relates to a titanium dioxide pigment composition having improved properties when used in polyamide printing inks. The composition of the instant invention comprises titanium dioxide pigment particles coated with small but effective amounts of the nonanoic acid salt of triethanolamine and the propionic acid salt of triethanolamine.

BACKGROUND OF THE INVENTION

Titanium dioxide pigment material has been accepted for a long time as an opacifier in the printing ink industry. Prior art titanium dioxide pigments however tend to be abrasive when used in printing inks and in addition usually produce ink compositions which have a high viscosity. These and other difficulties are overcome when the titanium dioxide pigment compositions of the instant invention are employed in the printing ink industry.

SUMMARY OF THE INVENTION

Broadly the instant invention covers a new composition of matter comprising titanium dioxide pigment particles coated with from 0.2% to 1.0% of a combination of treating agents consisting of the nonanoic acid salt of triethanolamine plus the propionic acid salt of triethanolamine. This invention also contemplates a process for producing the said coated pigment composition of matter.

DESCRIPTION OF THE PREFERRED EMBODIMENT

The $TiO_2$ pigment material used in the present invention may be of the anatase or rutile modification made by either the well-known sulfate process or the chloride process. The $TiO_2$ pigment may be treated with small amounts of precalcination inorganic treating agents, such as are known and used in the art to enhance brightness and induce rutilization, as well as post-calcination treating agents, such as the hydrous oxides of titanium, aluminum, silicon, zirconium, and similar elements for improving the color, resistance to chalking and other pigmentary properties. The amounts of inorganic treating agents used are well known in the art and generally are less than about 5% of the weight of the pigment.

The titanium dioxide pigment particles, having been prepared by well-known processes and treated with inorganic treating agents, if desired, are then coated with the combination of organic treating agents used in the instant invention, preferably before the final milling step.

Although the organic treating agents may be formed in most any manner, a preferred method is described as follows:

A diluted triethanolamine solution is prepared. To this solution is added the nonanoic acid and the propionic acid. The amount of nonanoic acid employed is substantially the theoretical amount to form the nonanoic acid salt of triethanolamine. To this mixture is added the propionic acid. This agent is added preferably in amount to prevent the nonanoic acid salt of triethanolamine from crystallizing from solution. Excessive amounts of propionic acid tend to reduce the heat stability of the compounds formed and therefore any decomposition of the organic compounds formed results in a loss of effectiveness of the reagents employed.

Roughly speaking approximately 1 mole of nonanoic acid should be used for each mole of triethanolamine while only 0.12 to 0.25 mole of propionic acid should be used per mole of triethanolamine.

When the titanium dioxide pigment is treated with the above organic treating agents in amount from 0.2% to 1.0% and the coated pigment is subjected to a final milling step, the coated and ground pigment when incorporated into ink formulations produces a low viscosity ink with high gloss and with reduced abrasion properties.

These properties of the pigments are determined by the following tests:

20° Gloss Test

The $TiO_2$ is dispersed in a polyamide ink vehicle, which is 22% non-volatile and 78% solvent, using a laboratory blender. The $TiO_2$ is added in amount so that the resultant ink has 40% by weight $TiO_2$ concentration.

The gloss is measured on rollouts of the ink, made by using a hand proofer on a rigid mylar panel, using the standard method of test for specular gloss ASTM Designation D 523–67.

Abrasion Test

The $TiO_2$ is mixed with a long oil, nonoxidizing alkyd and passed twice through a 3-roller mill. The mill paste is then let-down with additional alkyd vehicle and solvent to give a dispersion which is 50% by weight $TiO_2$, 25% nonvolatile vehicle and 25% solvent.

This coating system is tested for abrasion using a Gravure Technical Association Ink Abrasion Tester. Transmittance measurements are made on the glass mirrors before and after abrasion with a Colormaster Colorimeter. (The higher the transmittance increase, the more abrasive is the pigment being tested.) A control pigment is included in every test series to insure agreement with previous runs.

Viscosity Test

The $TiO_2$ is dispersed in a polyamide resin, dissolved in solvents, using a laboratory blender to give an ink which is 40% by weight of $TiO_2$, 13% polyamide resin and 47% solvents.

The viscosity of the ink is measured using a Brookfield Viscometer with the appropriate spindle at 10 r.p.m.

In order to describe the invention in more detail, the following example is presented.

A calcined titanium dioxide pigment material was prepared from the hydrolysis of a titanium sulfate solution. It was wet milled, hydroclassified, treated with alumina and was filtered, washed and dried.

An organic treating agent was prepared as follows:

14 parts of triethanolamine (at 438 g.p.l. concentration) were mixed with 7.75 parts of water. With agitation 5.25 parts of nonanoic acid (100% concentration) were added to the mixture followed by the addition of 0.5 part of propionic acid (100% concentration).

The dried pigment described above was then treated with 0.5% of the organic treating agent prepared above, the amount is expressed as weight percent and is based on the weight of the $TiO_2$ present. The organic agent was sprayed onto the dried pigment material.

The treated pigment was then thoroughly dry milled.

The treated product was then evaluated in standard ink formulations and possessed the following properties:

20° gloss _____ 40
Viscosity (10 r.p.m.) _____ 30
Abrasion test _____ 7.5

These properties were also run on a titanium dioxide pigment which had no organic treatment and the results are recorded as follows:

| | |
|---|---|
| 20° gloss | 37 |
| Viscosity (10 r.p.m.) | 320 |
| Abrasion test | 9.7 |

While this invention has been described and illustrated by the examples shown, it is not intended to be strictly limited thereto, and other variations and modifications may be employed within the scope of the following claims.

I claim:

1. A new composition of matter comprising titanium dioxide pigment particles coated with a combination of treating agents consisting of the nonanoic acid salt of triethanol amine plus the propionic acid salt of triethanolamine, the amount of the combination of said treating agents being from 0.2% to 1.0%, based on the weight of the pigment.

2. Composition according to claim 1 in which approximately 1 mole of nonanoic acid is present for each mole of triethanolamine and only 0.12 to 0.25 mole of propionic acid is present per mole of triethanolamine.

References Cited

UNITED STATES PATENTS

| | | | |
|---|---|---|---|
| 2,305,379 | 12/1942 | Detrick et al. | 106—308 N |
| 2,819,174 | 1/1958 | Vartanian | 106—308 N X |
| 2,819,176 | 1/1958 | Vartanian | 106—308 N |
| 3,015,573 | 1/1962 | Myers et al. | 106—300 |
| 3,172,772 | 3/1965 | Rowe | 106—300 |
| 3,506,466 | 4/1970 | Bramekamp | 106—300 |
| 3,513,008 | 5/1970 | Lawrence | 106—300 |
| 3,514,304 | 5/1970 | Binnis | 106—300 |

TOBIAS E. LEVOW, Primary Examiner

H. M. S. SNEED, Assistant Examiner

U.S. Cl. X.R.

106—308 N